(12) United States Patent
Austrheim

(10) Patent No.: US 11,834,268 B2
(45) Date of Patent: Dec. 5, 2023

(54) STORAGE SYSTEM WITH MODULAR CONTAINER HANDLING VEHICLES

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 18/149,927

(22) Filed: Jan. 4, 2023

(65) Prior Publication Data

US 2023/0139127 A1    May 4, 2023

Related U.S. Application Data

(63) Continuation of application No. 17/059,218, filed as application No. PCT/EP2019/065244 on Jun. 11, 2019, now Pat. No. 11,572,231.

(30) Foreign Application Priority Data

Jun. 12, 2018 (NO) .................................... 20180813
Jul. 19, 2018 (NO) .................................... 20181005
(Continued)

(51) Int. Cl.
*B65G 1/04* (2006.01)

(52) U.S. Cl.
CPC ......... *B65G 1/0464* (2013.01); *B65G 1/0414* (2013.01); *B65G 2207/30* (2013.01)

(58) Field of Classification Search
CPC ................ B65G 1/0414; B65G 1/0464; B65G 2207/30; B62D 63/025; B60P 3/42
See application file for complete search history.

(56) References Cited

U.S. PATENT DOCUMENTS 3,519,150 A    7/1970    Keena et al.
3,800,963 A    4/1974    Holland
(Continued)

FOREIGN PATENT DOCUMENTS

CA        2988122 A1    12/2016
CN    101553416 A    10/2009
(Continued)

OTHER PUBLICATIONS

Search Report issued in Chinese Application No. 201980039066.2 dated Sep. 6, 2021 (2 pages).
(Continued)

*Primary Examiner* — Jonathan Snelting
(74) *Attorney, Agent, or Firm* — Osha Bergman Watanabe & Burton LLP

(57) ABSTRACT

A storage system including a storage grid including vertical column profiles defining a plurality of grid columns. The grid columns include storage columns, in which storage containers can be stored one on top of another in vertical stacks. The storage grid including at least one rail grid at the upper ends of the column profiles, and a first container handling vehicle and a second container handling vehicle. The first and the second container handling vehicles each include at least one wheel base unit and a first container handling module or a second container handling module. Each wheel base unit having a wheel arrangement for movement of the wheel base unit in two perpendicular directions upon a rail grid of the storage system. The first container handling module is a different type of container handling module to the second container handling module.

11 Claims, 14 Drawing Sheets

(30) Foreign Application Priority Data

Aug. 2, 2018 (NO) .................................. 20181039
Dec. 12, 2018 (NO) .................................. 20181595

(56) References Cited

U.S. PATENT DOCUMENTS

| | | | |
|---|---|---|---|
| 4,538,950 | A | 9/1985 | Shiomi et al. |
| 4,909,697 | A | 3/1990 | Bernard, II et al. |
| 5,078,566 | A | 1/1992 | Ferrence |
| 5,360,306 | A | 11/1994 | Nakayama et al. |
| 5,538,809 | A | 7/1996 | Bittihn et al. |
| 7,101,139 | B1 | 9/2006 | Benedict |
| 8,628,289 | B1 | 1/2014 | Benedict et al. |
| 9,527,669 | B1 | 12/2016 | Hanssen et al. |
| 10,921,819 | B2 * | 2/2021 | Brucker ............... G05D 1/0278 |
| 11,307,596 | B2 * | 4/2022 | Mackin ................... B60P 3/42 |
| 11,572,231 | B2 * | 2/2023 | Austrheim ........... B65G 1/0464 |
| 11,591,023 | B2 * | 2/2023 | Park ..................... B66F 9/0755 |
| 2003/0093176 | A1 | 5/2003 | Ohtsuka et al. |
| 2005/0047895 | A1 | 3/2005 | Lert |
| 2005/0118003 | A1 | 6/2005 | Mitchell et al. |
| 2008/0014062 | A1 | 1/2008 | Yuyama et al. |
| 2011/0027059 | A1 | 2/2011 | Benedict et al. |
| 2012/0282068 | A1 | 11/2012 | Tschurwald et al. |
| 2013/0302132 | A1 | 11/2013 | Raffaello et al. |
| 2014/0014470 | A1 | 1/2014 | Razumov |
| 2014/0086714 | A1 | 3/2014 | Malik |
| 2014/0277693 | A1 | 9/2014 | Naylor |
| 2014/0288696 | A1 | 9/2014 | Lert |
| 2014/0292274 | A1 | 10/2014 | Dorval et al. |
| 2014/0311858 | A1 | 10/2014 | Keating et al. |
| 2015/0127143 | A1 | 5/2015 | Lindbo et al. |
| 2016/0060033 | A1 | 3/2016 | Izumi |
| 2016/0060037 | A1 | 3/2016 | Razumov |
| 2016/0107838 | A1 | 4/2016 | Swinkels et al. |
| 2016/0137435 | A1 | 5/2016 | Tanaka et al. |
| 2016/0145058 | A1 | 5/2016 | Lindbo |
| 2016/0176638 | A1 | 6/2016 | Toebes |
| 2016/0194151 | A1 | 7/2016 | Lindbo et al. |
| 2016/0236867 | A1 | 8/2016 | Brazeau et al. |
| 2016/0325932 | A1 | 11/2016 | Hognaland |
| 2017/0050809 | A1 | 2/2017 | Itoh et al. |
| 2017/0057745 | A1 | 3/2017 | Ueda et al. |
| 2017/0166400 | A1 | 6/2017 | Hofmann |
| 2018/0044110 | A1 | 2/2018 | Clarke et al. |
| 2018/0068253 | A1 | 3/2018 | Simms et al. |
| 2018/0072212 | A1 * | 3/2018 | Alfaro .................. B60K 7/0007 |
| 2018/0082162 | A1 | 3/2018 | Durham et al. |
| 2018/0082165 | A1 | 3/2018 | Mosteller |
| 2018/0118078 | A1 | 5/2018 | Alkhaldi et al. |
| 2018/0141754 | A1 | 5/2018 | Garrett et al. |
| 2018/0150793 | A1 | 5/2018 | Lert, Jr. et al. |
| 2020/0148474 | A1 | 5/2020 | Salichs et al. |

FOREIGN PATENT DOCUMENTS

| | | |
|---|---|---|
| CN | 101711210 A | 5/2010 |
| CN | 102050333 A | 5/2011 |
| CN | 102992012 A | 3/2013 |
| CN | 104066661 A | 9/2014 |
| CN | 104781163 A | 7/2015 |
| CN | 104885106 A | 9/2015 |
| CN | 105383848 A | 3/2016 |
| CN | 105517923 A | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106660703 A | 5/2017 |
| CN | 106662874 A | 5/2017 |
| CN | 106829298 A | 6/2017 |
| CN | 206790852 U | 12/2017 |
| CN | 108140168 A | 6/2018 |
| DE | 4016810 C1 | 11/1991 |
| DE | 9310690 U1 | 9/1993 |
| DE | 102009017241 A1 | 10/2010 |
| DE | 102013009340 A1 | 12/2014 |
| EP | 0133742 A1 | 3/1985 |
| EP | 0458021 A1 | 11/1991 |
| EP | 0534558 A1 | 3/1993 |
| EP | 2881905 A1 | 6/2015 |
| EP | 3003932 A1 | 4/2016 |
| GB | 1 267 751 A | 3/1972 |
| GB | 1276160 A | 6/1972 |
| GB | 2106070 A | 4/1983 |
| GB | 2211822 A | 7/1989 |
| GB | 2233319 A | 1/1991 |
| JP | S60-137703 A | 7/1985 |
| JP | S6417707 A | 1/1989 |
| JP | S6485656 A | 3/1989 |
| JP | H06-043936 A | 2/1994 |
| JP | H08-217209 A | 8/1996 |
| JP | H09152914 A | 6/1997 |
| JP | H11-143538 A | 5/1999 |
| JP | 2000044010 A | 2/2000 |
| JP | 2000191106 A | 7/2000 |
| JP | 2003137406 A | 5/2003 |
| JP | 2009184775 A | 8/2009 |
| JP | 2011-102166 A | 5/2011 |
| JP | 2015-535517 A | 12/2015 |
| JP | 2017088404 A | 5/2017 |
| JP | 2017-524625 A | 8/2017 |
| KR | 20170026074 A | 3/2017 |
| NO | 317366 B1 | 10/2004 |
| NO | 20181005 A1 | 12/2019 |
| NO | 20181039 A1 | 12/2019 |
| RU | 2008111257 A | 10/2009 |
| WO | 96/14258 A1 | 5/1996 |
| WO | 2005077789 A1 | 8/2005 |
| WO | 2008149018 A2 | 12/2008 |
| WO | 2012/106746 A1 | 8/2012 |
| WO | 2014/075937 A1 | 5/2014 |
| WO | 14090684 A1 | 6/2014 |
| WO | 2014/195901 A1 | 12/2014 |
| WO | 2014203126 A1 | 12/2014 |
| WO | 2015/084236 A1 | 6/2015 |
| WO | 2015/140216 A1 | 9/2015 |
| WO | 2015/170660 A1 | 11/2015 |
| WO | 15193278 A1 | 12/2015 |
| WO | 2016100045 A1 | 6/2016 |
| WO | 2016166294 A1 | 10/2016 |
| WO | 2016166323 A1 | 10/2016 |
| WO | 2016/196815 A1 | 12/2016 |
| WO | 2016198467 A1 | 12/2016 |
| WO | 2016198565 A1 | 12/2016 |
| WO | 2017/081281 A1 | 5/2017 |
| WO | 2017/081273 A1 | 5/2017 |
| WO | 2017/121512 A1 | 7/2017 |
| WO | 2017/121515 A1 | 7/2017 |
| WO | 2017/144054 A1 | 8/2017 |
| WO | 2017153563 A1 | 9/2017 |
| WO | 2017211640 A1 | 12/2017 |
| WO | 2017220651 A1 | 12/2017 |
| WO | 2018/162757 A1 | 9/2018 |
| WO | 2019/101725 A1 | 5/2019 |
| WO | 2019238703 A1 | 12/2019 |

OTHER PUBLICATIONS

Office Action issued in the counterpart Chinese Patent Application No. 201980039066.2, dated Sep. 10, 2021 (10 pages).
Office Action issued in Chinese Application No. 201980037162.3; dated Sep. 27, 2021 (8 pages).
Extended European Search Report issued in European Application No. 21186410.3, dated Nov. 25, 2021 (5 pages).
Office Action issued in the counterpart Chinese Patent Application No. 201980037723X, dated Sep. 17, 2021 (25 pages).
Office Action issued in the counterpart Chinese Patent Application No. 2019800383353, dated Dec. 17, 2021 (3 pages).
Office Action in counterpart Chinese Patent Application No. 201980038106.1 dated Sep. 8, 2021 (6 pages).

(56) References Cited

OTHER PUBLICATIONS

Office Action in counterpart Chinese Patent Application No. 201980039693.6 dated Oct. 18, 2021 (12 pages).
Office Action in counterpart Chinese Patent Application No. 201980039028.7 dated Oct. 27, 2021 (15 pages).
Office Action in counterpart Chinese Patent Application No. 201980039046.5 dated Sep. 15, 2021 (18 pages).
Office Action in counterpart Chinese Patent Application No. 201980039068.1 dated Sep. 15, 2021 (23 pages).
Office Action issued in Chinese Application No. 2019800388569 dated Oct. 19, 2021 (16 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).
United States Office Action in related U.S. Appl. No. 16/972,482, dated Mar. 22, 2022 (46 pages).
ISR dated Sep. 2, 2019 in PCT/EP2019/065153, filed inter alia as a statement of relevent for any non-English refs cited therein.
ISR dated Sep. 25, 2019 in PCT/EP2019/065244, filed inter alia as a statement of relevent for any non-English refs cited therein.
NOSR dated Mar. 12, 2019 in NO 20181595, filed inter alia as a statement of relevent for any non-English refs cited therein.
NOSR dated Sep. 20, 2018 in NO 20181039, filed inter alia as a statement of relevent for any non-English refs cited therein.
NOSR dated Feb. 6, 2019 in NO 20181005, filed inter alia as a statement of relevent for any non-English refs cited therein.
Office Action issued in counterpart Japanese Patent Application No. 2020-569140 dated Jun. 2, 2023 (5 pages).
Office Action issued in counterpart Japanese Patent Application No. 2020-568714 dated Jul. 3, 2023 (16 pages).
Office Action issued in counterpart Japanese Patent Application No. 2020-568805 dated Jun. 5, 2023 (10 pages).
Office Action issued in counterpart Japanese Patent Application No. 2020-568698 dated May 29, 2023 (10 pages).
Office Action issued in counterpart Japanese Patent Application No. 2020-569128 dated Jul. 3, 2023 (6 pages).
Office Action issued in counterpart Japanese Patent Application No. 2020-568712 dated Jun. 26, 2023 (7 pages).

\* cited by examiner

STORAGE SYSTEM WITH MODULAR CONTAINER HANDLING VEHICLES

TECHNICAL FIELD

The present invention relates to the field automated storage systems.

BACKGROUND

FIGS. 1A and 2B disclose a typical prior art automated storage and retrieval system 1 with a framework structure 100. FIGS. 1B and 2B disclose prior art container handling vehicles 200,300 operating in the system 1 disclosed in FIGS. 1A and 2A, respectively.

The framework structure 100 defines a storage grid 104 comprising a plurality of upright members 102 and optionally a plurality of horizontal members 103 supporting the upright members 102. The members 102, 103 may typically be made of metal, e.g., extruded aluminum profiles.

The storage grid 104 comprises multiple grid columns 112. A large majority of the grid columns are also termed storage columns 105, in which storage containers 106, also known as bins, are stacked one on top of another to form stacks 107.

Each storage container 106 may typically hold a plurality of product items (not shown), and the product items within a storage container 106 may be identical or may be of different product types depending on the application.

The grid columns 112 of the storage grid 104 guard against horizontal movement of the of storage containers 106 in the stacks 107, and guides vertical movement of the containers 106, but does normally not otherwise support the storage containers 106 when stacked.

The automated storage and retrieval system 1 comprises a rail system 108 (or a top rail grid) arranged in a grid pattern across the top of the storage grid 104, on which rail system 108 a plurality of container handling vehicles 200,300 (as exemplified in FIGS. 1B and 2B) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 2A marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines the upper ends of the grid columns 112 above which the container handling vehicles 200,300 can move laterally, i.e., in a plane which is parallel to the horizontal X-Y plane. Commonly, at least one of the sets of rails 110,111 is made up of dual-track rails allowing two container handling vehicles to pass each other on neighboring grid cells 122. Dual-track rails are well-known and disclosed in for instance WO 2015/193278 A1 and WO 2015/140216 A1, the contents of which are incorporated herein by reference. Each prior art container handling vehicle 200,300 comprises a vehicle body and a wheel arrangement of eight wheels 201,301, wherein a first set of four wheels 32a enable the lateral movement of the container handling vehicles 200,300 in the X direction and a second set of four wheels 32b enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device 18 (only shown in FIG. 2B) for vertical transportation of storage containers 106, e.g., raising a storage container 106 from, and lowering a storage container 106 into, a grid column 112. The lifting device 18 comprises four metal lifting bands 16 extending in a vertical direction and connected close to the corners of a lifting frame 17 (may also be termed a gripping device) such that the lifting frame is kept horizontal. The lifting frame 17 features container connecting elements 24 for releasable connection to a storage container, and guiding pins 30.

Conventionally, and also for the purpose of this application, Z=1 identifies the uppermost layer of the storage grid 104, i.e., the layer immediately below the rail system 108, Z=2 the second layer below the rail system 108, Z=3 the third layer etc. In the prior art storage grid disclosed in FIGS. 1A and 2A, Z=8 identifies the lowermost, bottom layer of the storage grid 104. Consequently, as an example, and using the Cartesian coordinate system X, Y, Z indicated in FIGS. 1A and 2B, the storage container identified as 106' in FIG. 1 can be said to occupy grid location or cell X=10, Y=2, Z=3. The container handling vehicles 200,300 can be said to travel in layer Z=0 and each grid column can be identified by its X and Y coordinates. Each container handling vehicle 200 comprises a storage compartment or space (not shown) for receiving and stowing a storage container 106 when transporting the storage container 106 across the top of the storage grid 104. The storage space may comprise a cavity arranged centrally within the vehicle body, e.g., as is described in WO2014/090684A1, the contents of which are incorporated herein by reference. Alternatively, the container handling vehicles 300 may have a cantilever construction as described in N0317366, the contents of which are also incorporated herein by reference.

The container handling vehicles 200 may have a footprint, i.e., an extent in the X and Y directions, which is generally equal to the horizontal area of a grid cell 122, i.e., the extent of a grid cell 122 in the X and Y directions, e.g., as is described in WO2015/193278A1, the contents of which are incorporated herein by reference. Alternatively, the container handling vehicles 200 may have a footprint which is larger than the horizontal area of a grid cell 122, e.g., as is disclosed in WO2014/090684A1.

In a storage grid 104, most of the grid columns 112 are storage columns 105, i.e., grid columns wherein storage containers 106 are stored in stacks 107. However, a storage grid 104 normally has at least one grid column 112 which is not used for storing storage containers 106, but is arranged at a location wherein the container handling vehicles 200, 300 can drop off and/or pick up storage containers 106 so that they can be transported to a second location (not shown) where the storage containers 106 can be accessed from outside of the storage grid 104 or transferred out of or into the grid 104. Within the art, such a location is normally referred to as a "port" and the grid column 112 at which the port is located may be referred to as a transfer column 119,120. The drop-off and pick-up ports are the upper ends/openings of a respective transfer column 119,120.

The prior art storage grids 104 in FIGS. 1A and 2A comprise two transfer columns 119 and 120. The first transfer column 119 may for example comprise a dedicated drop-off port where the container handling vehicles 200,300 can drop off storage containers 106 to be transported through the transfer column 119 and further to e.g., a picking/stocking station, and the second transfer column 120 may comprise a dedicated pick-up port where the container handling vehicles 200,300 can pick up storage containers 106 that have been transported through the transfer column 120 from e.g., a picking/stocking station. A storage container may be transported through a transfer column by use of the lifting device of a container handling vehicle 200,300 or by use of a storage container lift arranged in the transfer column. Each of the ports of the first and second transfer column may be suitable for both pick-up and drop-off of storage containers.

The second location may typically be a picking/stocking station, wherein product items are removed from and/or positioned into the storage containers 106. In a picking/stocking station, the storage containers 106 are normally never removed from the automated storage and retrieval system 1 but are returned into the storage grid 104 once accessed.

For monitoring and controlling the automated storage and retrieval system 1, e.g., monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other, the automated storage and retrieval system 1 comprises a computerized control system (not shown) which typically comprises a database for keeping track of the storage containers 106.

A conveyor system including conveyor belts or rollers is commonly employed to transport the storage containers from a lower end of the transfer columns 119,120 to e.g., a picking/stocking station.

A conveyor system may also be arranged to transfer storage containers between different storage grids, e.g., as is described in WO2014/075937A1, the contents of which are incorporated herein by reference.

Further, WO2016/198467A1, the contents of which are incorporated herein by reference, discloses an example of a prior art access system having conveyor belts (FIGS. 5a and 5b in WO2016/198467A1) and a frame mounted rail (FIGS. 6a and 6b in WO2016/198467A1) for transporting storage containers between transfer columns and stations where operators can access the storage containers.

When a storage container 106 stored in the storage grid 104 disclosed in FIG. 1A is to be accessed, one of the container handling vehicles 200,300 is instructed to retrieve the target storage container 106 from its position in the storage grid 104 and transport it to or through the transfer column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the transfer column 119. If the target storage container 106 is located deep within a stack 107, i.e., with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the transfer column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the transfer column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105 or relocated to other storage columns 105.

The applicant is developing highly advantageous solutions for obtaining storage systems that are both more efficient and flexible than the prior art systems. A common feature of these solutions is the requirement of multiple types of storage system vehicles for moving upon a rail grid, wherein each type of vehicle is specifically designed to be effective when performing a dedicated operation, such as transport of storage container, lifting of storage containers, digging etc. An optimum performance of the different storage system vehicles may be obtained when the vehicles are designed independent of each other. However, having different types of storage system vehicles designed independently of each other may have some disadvantages related to costs in that they may require different spare parts, require different solutions for charging of the vehicle batteries, different constructions of the wheel arrangement allowing them to move upon a rail grid etc.

The aim of the present invention is to alleviate or mitigate at least some of the possible disadvantages related to the construction of multiple types of vehicles for moving upon a rail grid of a storage system.

SUMMARY

The present invention is defined by the appended claims and in the following. In a first aspect, the present invention provides a storage system including: a storage grid including vertical column profiles defining a plurality of grid columns, the grid columns comprise storage columns, in which storage containers can be stored one on top of another in vertical stacks, the storage grid including at least one rail grid at the upper ends of the column profiles; a first container handling vehicle and a second container handling vehicle, the first and the second container handling vehicles each including at least one wheel base unit and a first container handling module or a second container handling module, respectively, connected to the wheel base unit; each wheel base unit having a wheel arrangement for movement of the wheel base unit in two perpendicular directions upon a rail grid of the storage system and a horizontal periphery fitting within the horizontal area defined by a grid cell of the rail grid such that two wheel base units may pass each other on any adjacent grid cells of the rail grid, each of the wheel base units comprises an upper surface configured as a connecting interface for connection to any of the first and second container handling modules, and the first container handling module is a different type of container handling module to the second container handling module.

In other words, the first type of container handling vehicle features a container handling module different to the container handling module of the second type of container handling vehicle.

In other words, the second type of container handling vehicle may feature any of the container handling modules not comprised by the first type of container handling vehicle.

In an embodiment of the storage system, the grid columns comprise storage columns, in which storage containers can be stored one on top of another in vertical stacks, and at least one transfer column, each of the grid columns being defined by four vertically extending column profiles, and the column profiles are
interconnected at their upper ends by top rails forming a horizontal top rail grid of the storage grid.

In an embodiment of the storage system, the first and/or the second container handling vehicles can lift and lower a storage container within a grid column and/or transfer a storage container upon a rail grid.

Each of the first and the second container handling module may comprise a connecting interface for connection to at least one wheel base unit, the connecting interface may be arranged to connect to the upper surface of a wheel base unit.

In an embodiment of the storage system, the connecting interface of the wheel base unit comprises a horizontal top panel featuring multiple connecting elements. The top panel may comprise a center opening, i.e., such that the top panel forms a flange extending inwards from the periphery of the wheel base unit.

The connecting elements of the top panel/flange may be through-holes or bolts arranged to interact with corresponding bolts or through-holes of the connecting interface of the container handling modules. In an embodiment, the connecting interface of both the wheel base unit and the container handling modules comprises corresponding through-holes and the wheel base unit is connected to a container handling module by bolts.

In an embodiment of the storage system, each of the first and the second container handling module comprises a connecting interface for connection to the connecting interface of the wheel base unit.

In an embodiment of the storage system, the connecting interface of the first and the second container handling module comprises connecting elements arranged at positions corresponding to the multiple connecting elements of the top panel/flange.

In an embodiment of the storage system, the top panel/flange features a center opening allowing access to internal components of the wheel base unit. The internal components may include electric motors for driving the wheel arrangement, a rechargeable battery and electronic control systems. Access to the rechargeable battery and the electronic control system allows them to be easily connected to a container handling module connected to the wheel base unit.

In an embodiment of the storage system, one of the first and the second container handling modules includes a cantilever section having a lifting device, wherein the container handling module is connected to a single wheel base unit and the lifting device is arranged to raise and lower a storage container within a grid column positioned below the cantilever section.

In an embodiment of the storage system, one of the first and the second container handling modules includes a bridge section to which at least one lifting device is connected, wherein the container handling module is connected to two separate wheel base units, such that the bridge section is supported by a wheel base unit at each of two opposite ends and the lifting device is arranged to raise and lower a storage container within a grid column positioned below the bridge section.

In an embodiment of the storage system, one of the first and the second container handling modules includes a storage container carrier, wherein the container handling module is connected to a single wheel base unit, such that a storage container may be supported on top of the wheel base unit.

In an embodiment of the storage system, one of the first and the second container handling modules includes a storage container carrier, wherein the container handling module is connected to a single wheel base unit, the storage container carrier including a conveyor unit, such that a storage container may be supported on top of the wheel base unit and moved in a lateral direction when the conveyor unit is activated.

In an embodiment of the storage system, the first or the second container handling vehicle includes two wheel base units and only one of the wheel base units includes electric motors for driving the wheel arrangement.

In an embodiment of the storage system, the first container handling vehicle includes a lifting device arranged to raise and lower a storage container within a grid column.

In an embodiment of the storage system, the first container handling vehicle includes a cantilever section and a lifting device, the lifting device is arranged to raise and lower a storage container within a grid column positioned below the cantilever section and comprises a lifting shaft, a motor for rotating the lifting shaft, a lifting frame for releasably connecting a storage container, and lifting bands connecting the lifting shaft to the lifting frame.

The cantilever section may extend beyond a horizontal periphery of the wheel base unit. The cantilever section may extend over a grid cell being adjacent to the grid cell occupied by the wheel base unit. The lifting frame may be suspended from the cantilever section.

In an embodiment of the storage system, the second container handling vehicle includes a container carrier connected to a single wheel base unit, such that a storage container may be supported on top of the wheel base unit.

In an embodiment, the storage system includes a transfer rail grid being separate from the rail grid at the upper ends of the column profiles, where the transfer rail grid includes rails upon which the wheel base unit may move in two perpendicular horizontal directions.

In an embodiment of the storage system, the transfer rail grid is arranged at a level below the level of the rail grid at the upper ends of the column profiles.

In an embodiment of the storage system, the transfer rail grid includes a section arranged below a transfer column of the storage grid structure, such that the first and/or the second container handling vehicle may raise or lower a storage container between the rail grid at the upper ends of the column profiles and a first and/or second container handling vehicle arranged on the transfer rail grid below the transfer column.

The horizontal periphery of the wheel base unit may fit within the horizontal area defined by a grid cell of any of the rail grid at the upper ends of the column profiles and the transfer rail grid.

In a second aspect, the present invention provides a wheel base unit for a storage system according to the first aspect, including a connecting interface for connection to the first or second container handling module, the connecting interface arranged at a topside of the wheel base unit and including a top plate having multiple through-holes and a center opening.

In an embodiment of the wheel base unit, the center opening allows access to at least one of a rechargeable battery and an electronic control system of the wheel base unit.

In an embodiment of the wheel base unit, the wheel arrangement includes a first set of wheels for movement in a first direction upon a rail grid and a second set of wheels for movement in a second direction perpendicular to the first direction, and each set of wheels includes two pairs of wheels arranged on opposite sides of the wheel base unit.

In a third aspect, the present invention provides a container handling vehicle for a storage system according to the first aspect, including at least one wheel base unit and a container handling module having a cantilever section including a lifting device, where the container handling module is connected to a single wheel base unit.

The lifting device of the container handling vehicle is arranged to raise/lower a storage container and includes a lifting frame for releasably connecting to a storage container, and optionally lifting bands/wires connecting the lifting frame to a lifting shaft on which the lifting bands/wires may be spooled.

In an embodiment, the container handling vehicle includes a bridge section to which at least one lifting device is connected and two wheel base units, the bridge section is connected to one of the wheel base units at each of two opposite ends of the bridge section and the lifting device is arranged between the wheel base units.

In a fourth aspect, the present invention provides a modular container handling vehicle system for a storage system according to the first aspect, including at least one wheel base unit and at least a first and a second type of container handling module, where the wheel base unit comprises a wheel arrangement for movement of the wheel base unit in two perpendicular directions upon a rail grid and an upper surface configured as a connecting interface for connection to any of the first and second container handling modules.

In an embodiment of the modular container handling vehicle system, the first and the second type of container handling module are selected from a container handling module including: a cantilever section having a lifting device, wherein the container handling module is connectable to a single wheel base unit and the lifting device is for raising and lowering a storage container positioned below the cantilever section; a bridge section to which at least one lifting device is connected, wherein the bridge section is connectable to two wheel base units, such that the bridge section is supported by a wheel base unit at each of two opposite ends and the lifting device is for raising and lowering a storage container positioned below the bridge section; a storage container carrier connectable to a single wheel base unit, such that a storage container may be supported on top of the wheel base unit; or a storage container carrier connectable to a single wheel base unit, the storage container carrier including a conveyor unit, such that a storage container may be supported on top of the wheel base unit and moved in a lateral direction when the conveyor unit is activated.

In an embodiment of the modular container handling vehicle system, one of the first and the second type of container handling modules is selected from a container handling module including a cantilever section having a lifting device, and the lifting device is arranged to raise and lower a storage container positioned below the cantilever section and includes a lifting shaft, a motor for rotating the lifting shaft, a lifting frame for releasably connecting the storage container and lifting bands connecting the lifting shaft to the lifting frame.

BRIEF DESCRIPTION OF DRAWINGS

Certain embodiments of the present invention will now be described in detail by way of example only and with reference to the following drawings.

DETAILED DESCRIPTION

The applicant is developing highly advantageous solutions for obtaining storage systems that are both more efficient and flexible than the prior art systems. A common feature of these solutions is the requirement of multiple types of storage system vehicles for moving upon a rail grid, wherein each type of vehicle is specifically designed to be effective when performing a dedicated operation, such as transport of storage container, lifting of storage containers, digging etc. An optimum performance of the different storage system vehicles may be obtained when the vehicles are designed independent of each other. However, having different types of storage system vehicles designed independently of each other may have some disadvantages related to costs in that they may require different spare parts, require different solutions for charging of the vehicle batteries, different constructions of the wheel arrangement allowing them to move upon a rail grid.

Figure 2A:
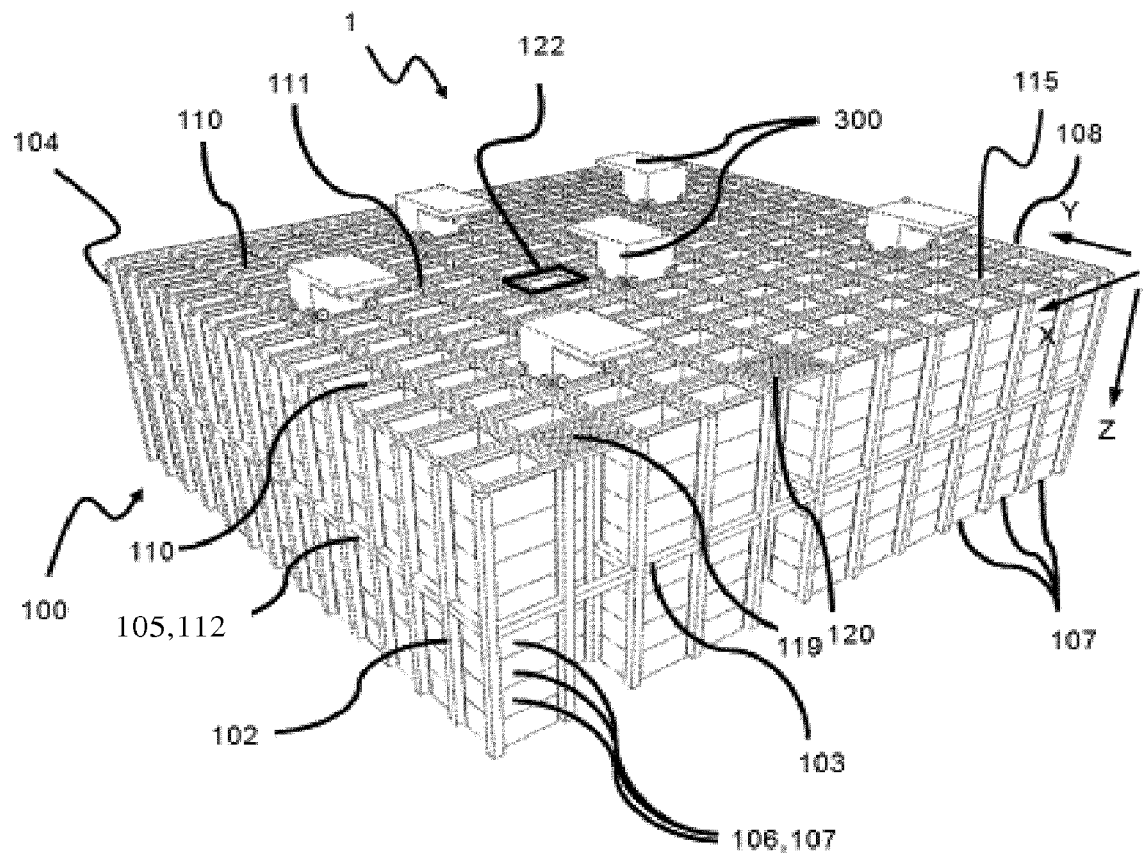
FIGS. 2A and 2B show a perspective side view of a prior art storage system and a prior art container handling vehicle.
Figure 2B:
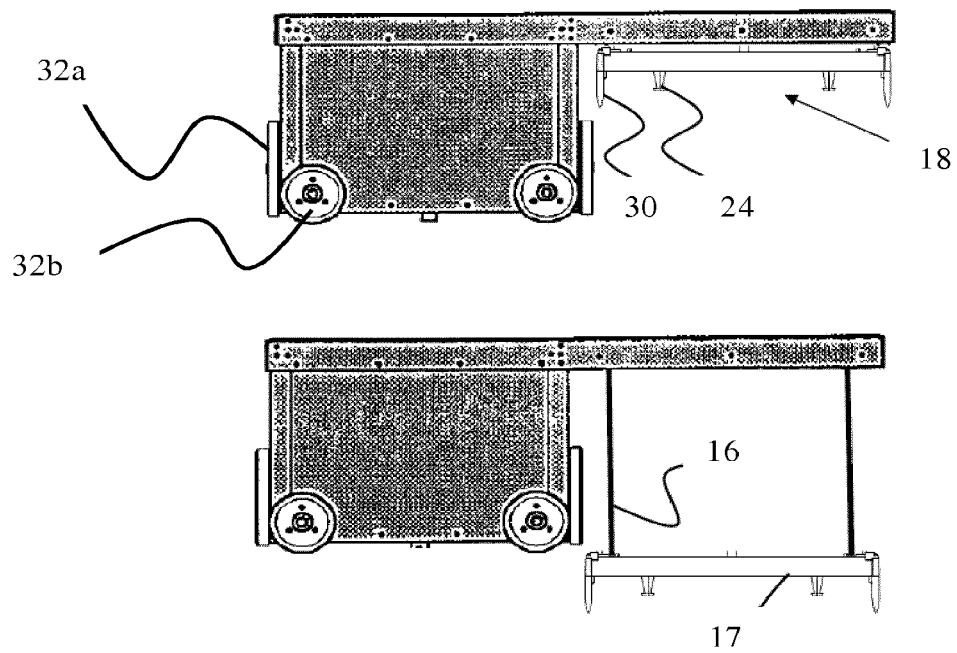
Figure 3:
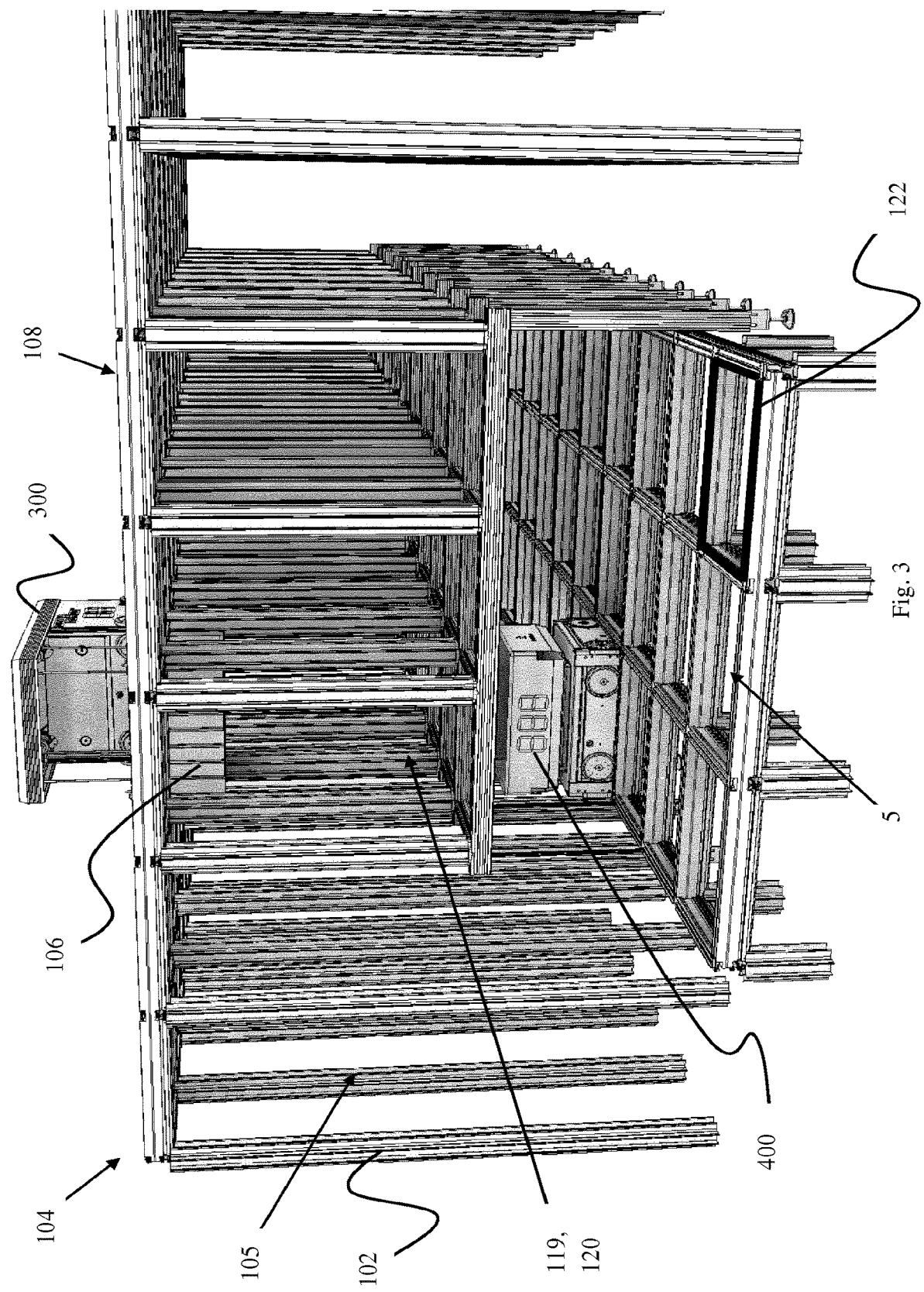
FIG. 3 is a perspective side view of a novel storage system.

An embodiment of a storage system being developed by the applicant is disclosed in FIG. 3. Similar to the prior art storage systems in FIGS. 1 and 2, the storage grid structure 104 is made up of multiple vertical column profiles 102 upon which a top rail grid 108 is arranged. The storage grid structure provides multiple storage columns 105 in which storage containers 106 may be stacked on top of each other.

A container handling vehicle 300 is arranged to move in two perpendicular directions upon the top rail grid 108 and features a lifting device to raise and/or lower storage container out of or into the storage columns, see description in the background section. In addition to the features known from the prior art, the storage system in FIG. 3 comprises a transfer rail grid 5 upon which a container transfer vehicle may move in two perpendicular directions. The transfer rail grid 5 features a section arranged below a transfer column 119,120 such that the container handling vehicle may lower a storage container to, or retrieve a storage container from, a container transfer vehicle 400 positioned below the transfer column. Further details of the storage system in FIG. 3 is described in the Norwegian patent applications N020181039 and N020181005, the contents of which is incorporated by reference.

Figure 4:
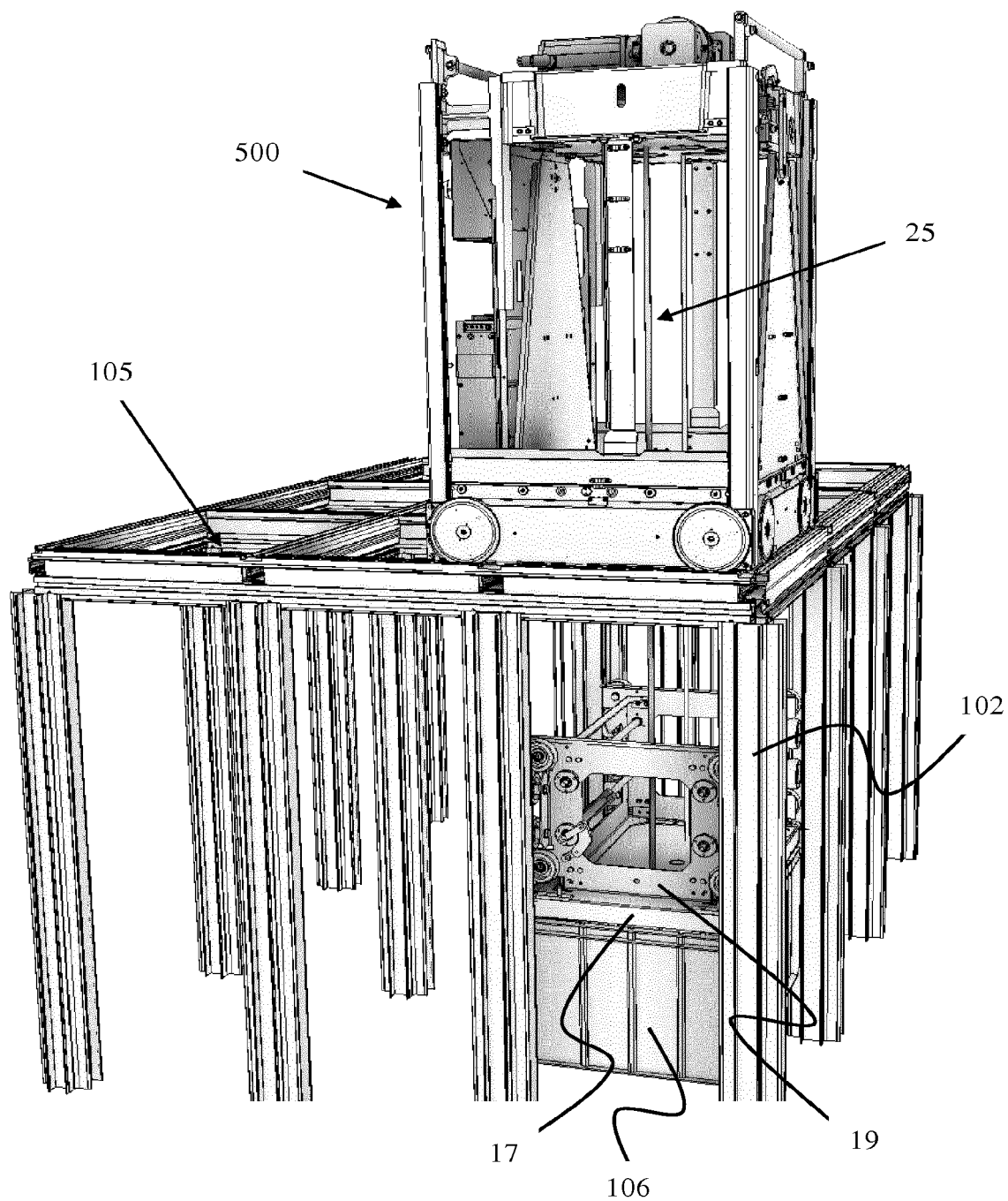
FIG. 4 is a perspective view of a novel container handling vehicle.

Another container handling vehicle 500 being developed by the applicant is shown in FIG. 4. The vehicle is somewhat similar to the prior art container handling vehicle 200 in FIG. 1B in that it features a cavity 25 in which a storage container 106 may be accommodated. However, in addition to a lifting device including a lifting frame 17, the vehicle in FIG. 4 comprises a guide shuttle 19 which allows the vehicle to lift a storage container a substantially increased height compared to the prior art vehicles.

Although providing several advantages in obtaining more efficient storage systems, the requirement of having container vehicles 300,400,500 of different designs may also increase the cost of such storage systems.

To alleviate some of the costs and potential disadvantages of a storage system requiring multiple types container vehicles, the applicant has developed a new storage system in which the various container vehicles comprises a common type of wheel base unit. By having a common type of wheel base unit, many service intensive parts are the same over the whole range of container vehicles and the production of different container vehicles are more standardized.

Figure 5:
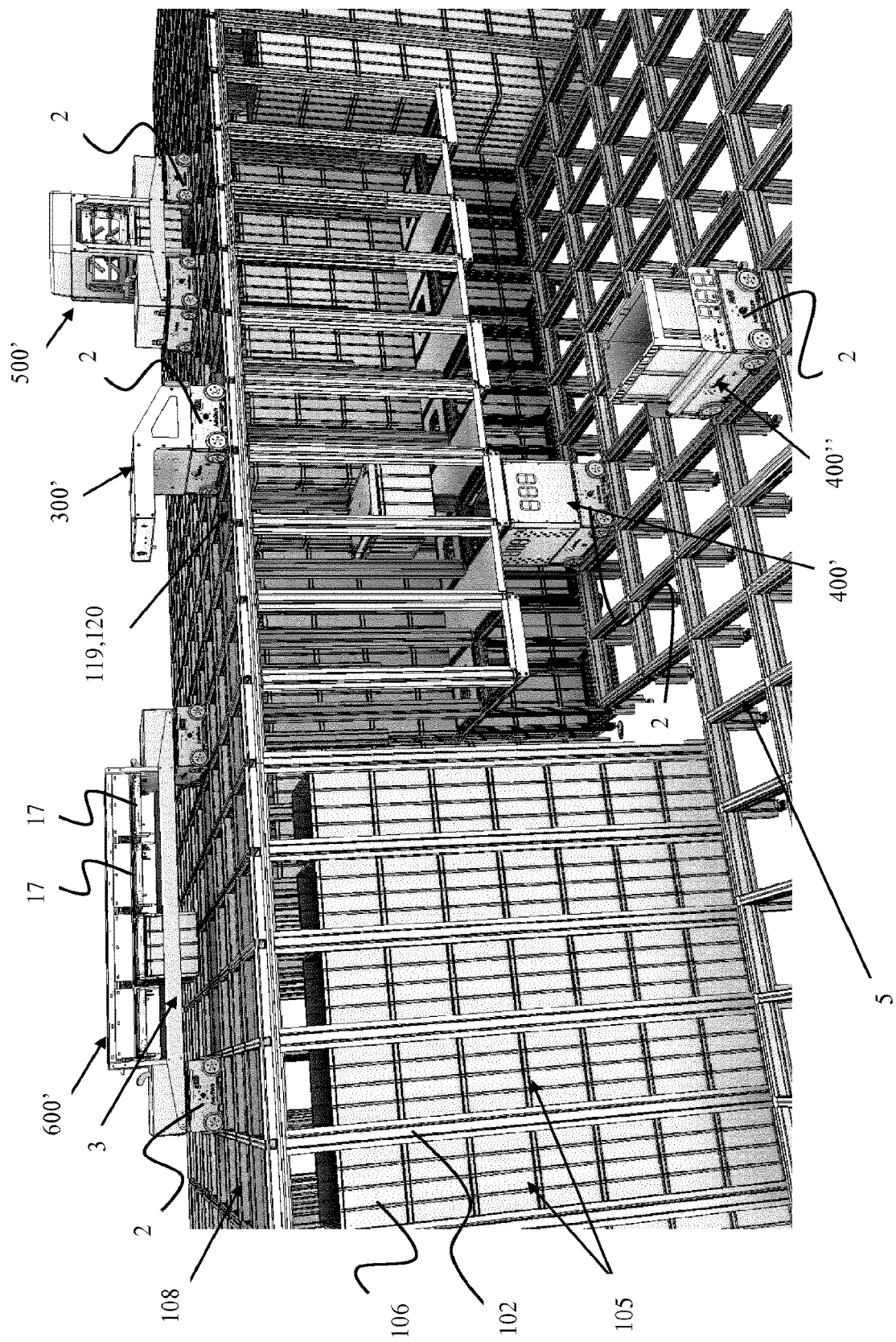
FIG. 5 is a perspective side view of an exemplary embodiment of a storage system according to the invention.
Figure 6:
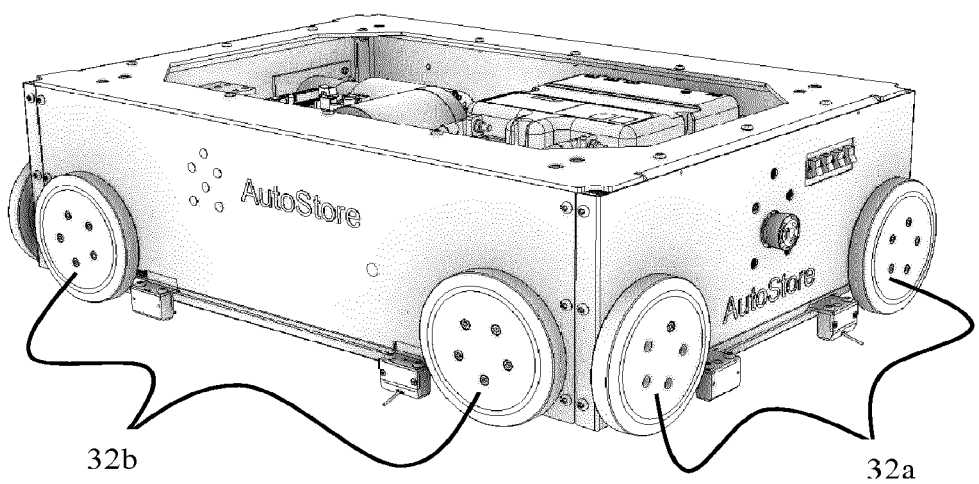
FIGS. 6-11 are perspective views of an exemplary embodiment of a wheel base unit according to the invention.
Figure 7:
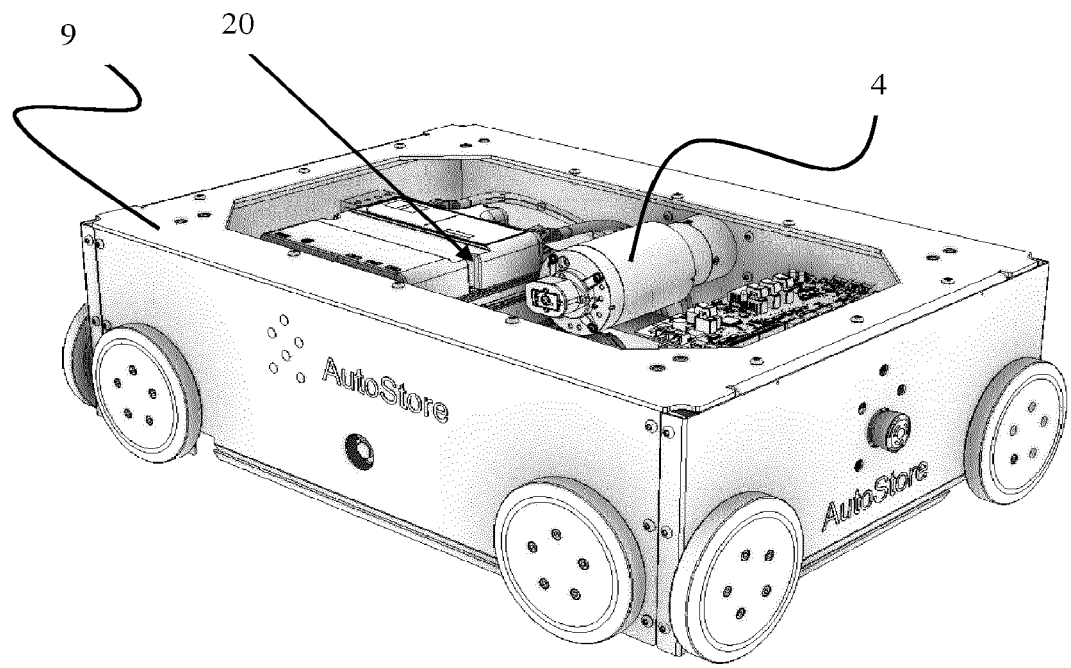
Figure 8:
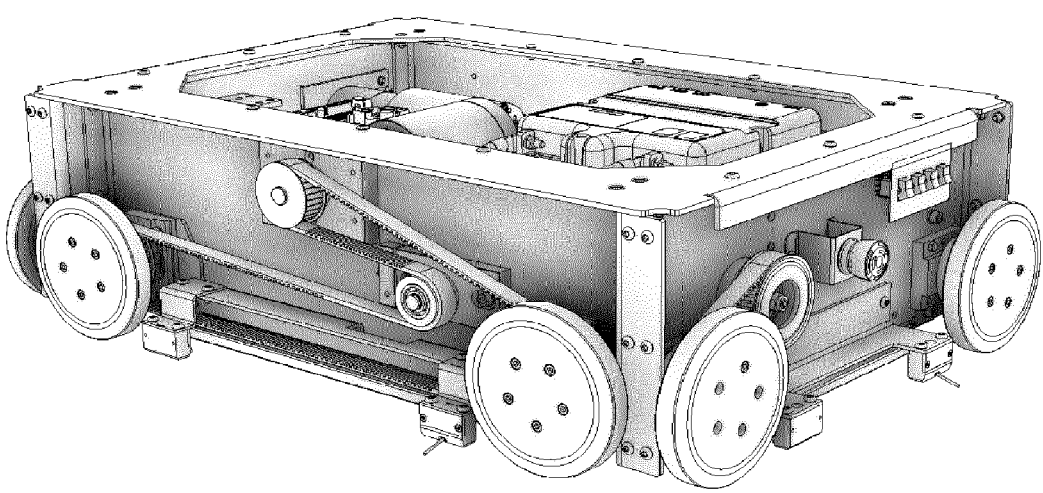
Figure 9:
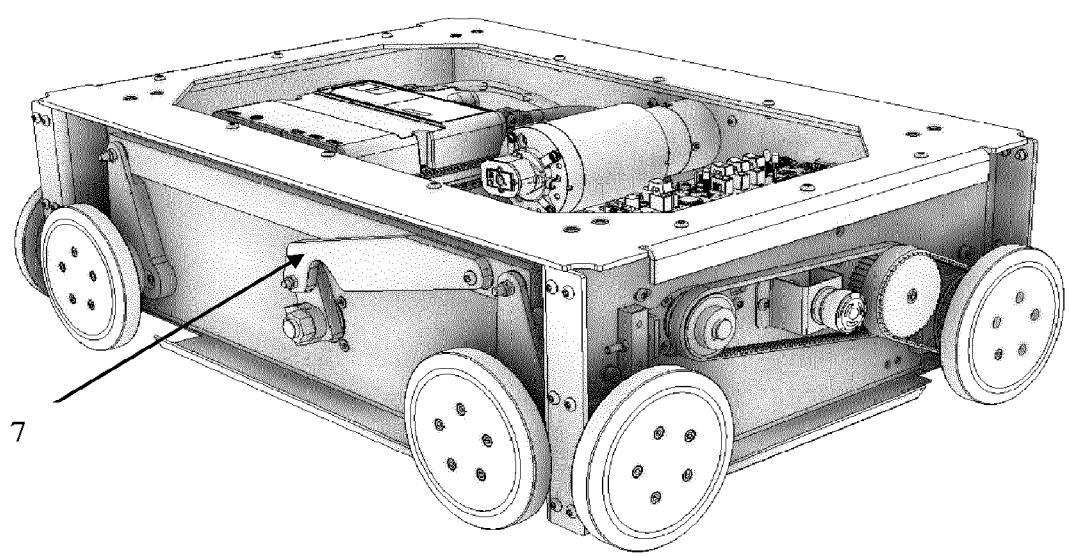
Figure 10:
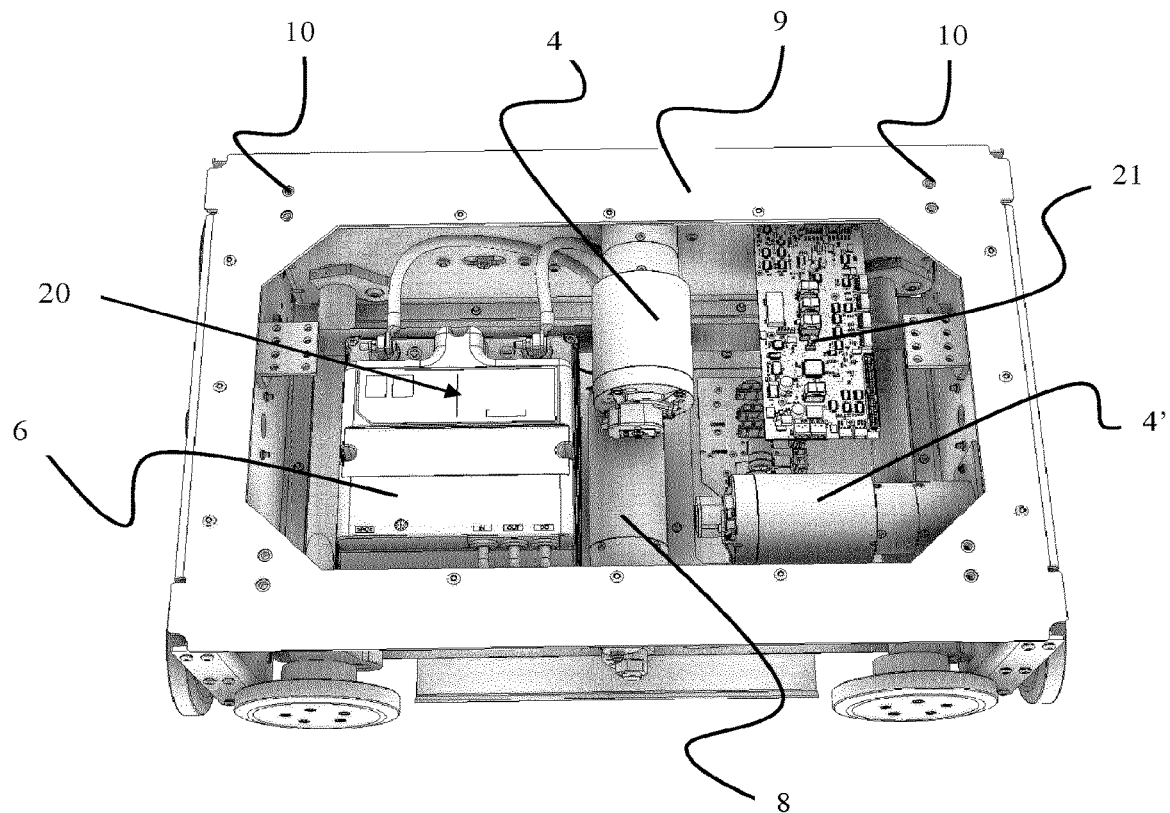
Figure 11:
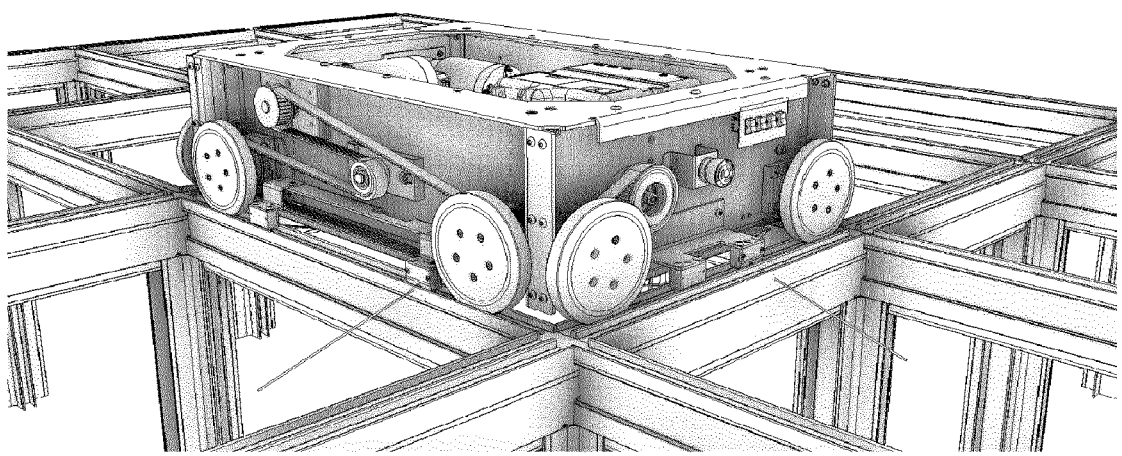
Figure 12:
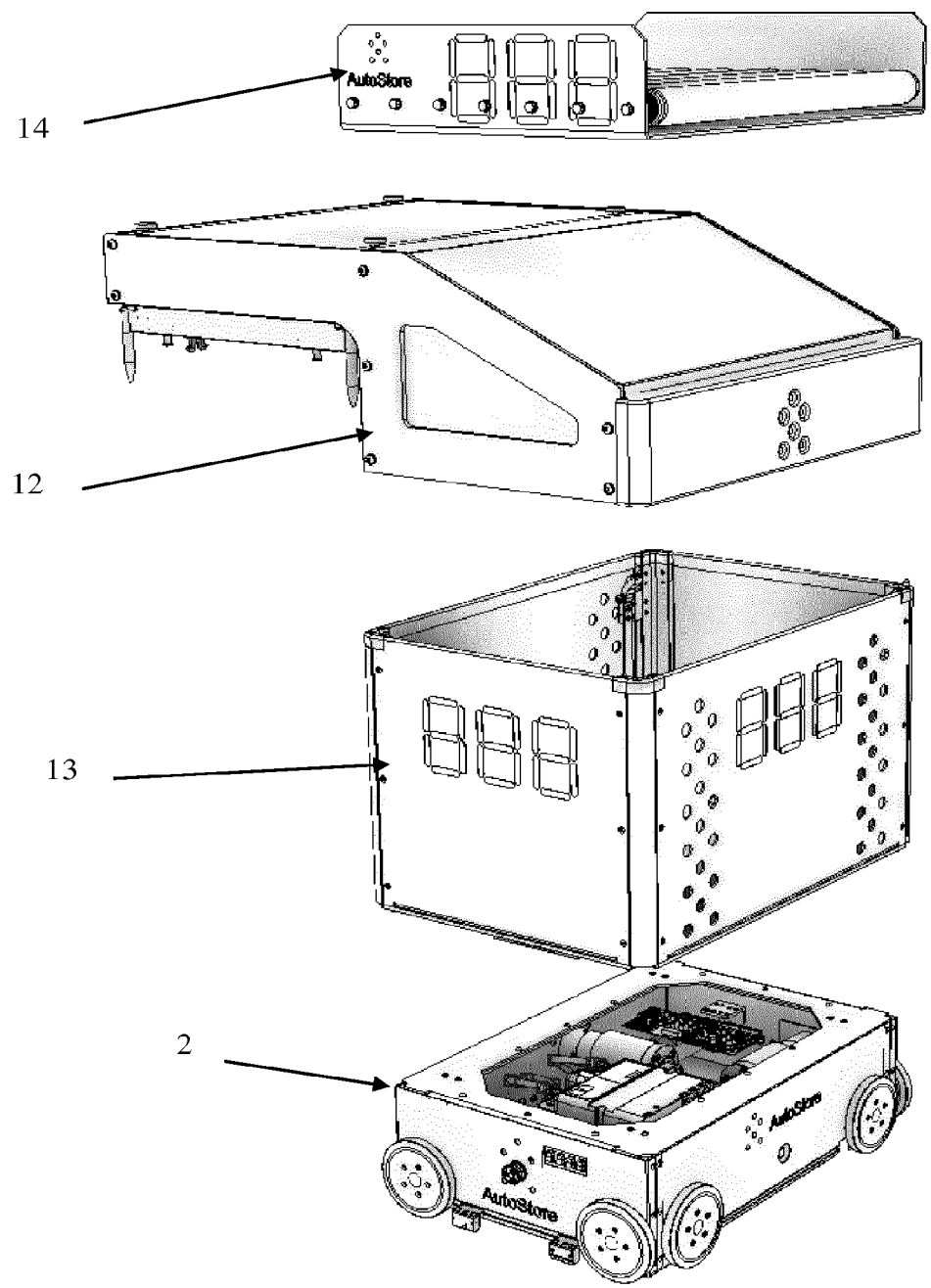
FIG. 12 is a perspective view of a modular vehicle system according to the invention.

An exemplary embodiment of an inventive storage system is shown in FIG. 5. To better illustrate the present invention, the specific embodiment comprises five different container vehicles, each featuring the same type of wheel base unit 2. Each of the different container vehicles features different container handling modules connected to the respective wheel base unit(s) 2 to obtain the required specialized function.

The storage grid structure 104 comprises the same features as the storage grid structure in FIG. 3.

An exemplary wheel base unit is shown in FIGS. 6-11. The wheel base unit 2 features a wheel arrangement 32a, 32b having a first set of wheels 32a for movement in a first direction upon a rail grid (i.e., any of the top rail grid 108 and the transfer rail grid 5) and a second set of wheels 32b for movement in a second direction perpendicular to the first direction. Each set of wheels comprises two pairs of wheels arranged on opposite sides of the wheel base unit 2. To change the direction in which the wheel base unit may travel upon the rail grid, one of the sets of wheels 32b is connected to a wheel displacement assembly 7. The wheel displacement assembly is able to lift and lower the connected set of wheels 32b relative to the other set of wheels 32a such that only the set of wheels travelling in a desired direction is in contact with the rail grid. The wheel displacement assembly 7 is driven by an electric motor 8. Further, two electric motors 4,4', powered by a rechargeable battery 6, are connected to the set of wheels 32a, 32b to move the wheel base unit in the desired direction.

Figure 1A:
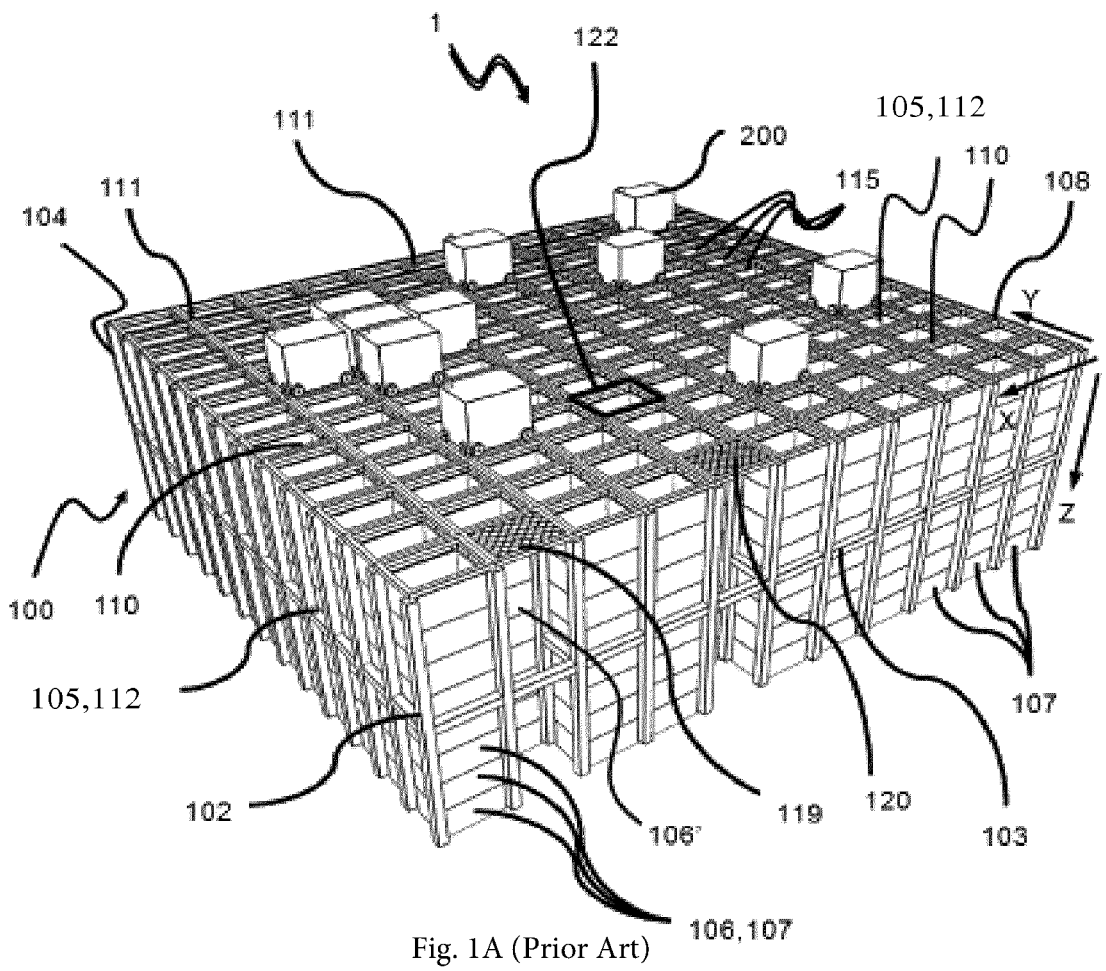
FIGS. 1A and 1B show a perspective side view of a prior art storage system and a prior art container handling vehicle.
Figure 1B:
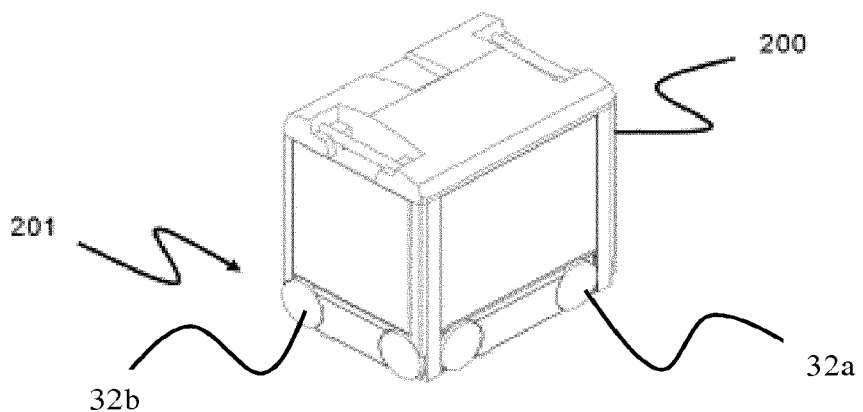

The horizontal periphery of the wheel base unit 2 is dimensioned to fit within the horizontal area defined by a grid cell 122, see FIGS. 1-3, of the rail grid such that two wheel base units may pass each other on any adjacent grid cells of the rail grid. In other words, the wheel base unit 2 may have a footprint, i.e., an extent in the X and Y directions, which is generally equal to the horizontal area of a grid cell 122, i.e., the extent of a grid cell 122 in the X and Y directions, e.g., as is described in WO2015/193278A1, the contents of which are incorporated herein by reference.

The wheel base unit 2 has a top panel/flange 9 (i.e., an upper surface) configured as a connecting interface for connection to a connecting interface of a selected container handling module. The top panel 9 have a center opening 20 and features multiple through-holes 10 (i.e., connecting elements) suitable for a bolt 11 connection via corresponding through-holes 10' in the connecting interface of a container handling module, see FIG. 19 for connection between a wheel base unit 2 and a container handling module featuring a cantilever section.

In other embodiments, the connecting elements of the top panel 9 may for instance be threaded pins for interaction with the through-holes 10' of the connecting interface of the container handling module, or vice versa. The presence of a center opening 20 is highly advantageous as it provides access to internal components of the wheel base unit, such as the rechargeable battery 6 and an electronic control system 21. The access allows the rechargeable battery 6 and the electronic control system 21 to be easily connected to a container handling module connected to the wheel base unit, thus the container handling module is not required to have its own dedicated power source and/or control system.

Three different types of container vehicles 300', 500', 600' are arranged on the top rail grid 108. Two different types of container handling vehicles 400',400" are arranged on the transfer rail grid 5.

The first type of container vehicle 600' is adapted to lift/lower several storage containers at the same time and is particularly suited for digging operations upon the top rail grid. In this embodiment, the container vehicle 600' comprises four lifting devices having a lifting frame 17, each able to lift a separate storage container. Commonly, the first type of container vehicle 600' will comprise two, three or four lifting devices. The first type of container vehicle comprises two wheel base units 2 positioned at opposite ends of the container vehicle 600'. The wheel base units 2 are interconnected by a container handling module including a bridge section 3 to which the four lifting devices are connected. When a container vehicle comprises two wheel base units 2, one of the wheel base units 2 may be used without electric motors 4,4' driving the set of wheels 32a, 32b. A prior art container vehicle adapted for lifting multiple storage containers and being suitable for digging operations is disclosed in WO 2019/101366 A1.

The second type of container vehicle 300' is adapted to perform the same functions as the prior art vehicle 300 described above. Details of the second type of container vehicle 300' is shown in FIGS. 16-19. The container handling module of the second type of container vehicle 300' comprises a cantilever section 12 featuring a lifting device arranged to raise and lower a storage container within a storage or transfer column positioned below the cantilever section (i.e., a container handling module). The lifting device comprises a lifting shaft 22 and a motor 23 for rotating the lifting shaft 22, a lifting frame 17 for releasably connecting a storage container and lifting bands 16 connecting the lifting shaft to the lifting frame.

Figure 19:
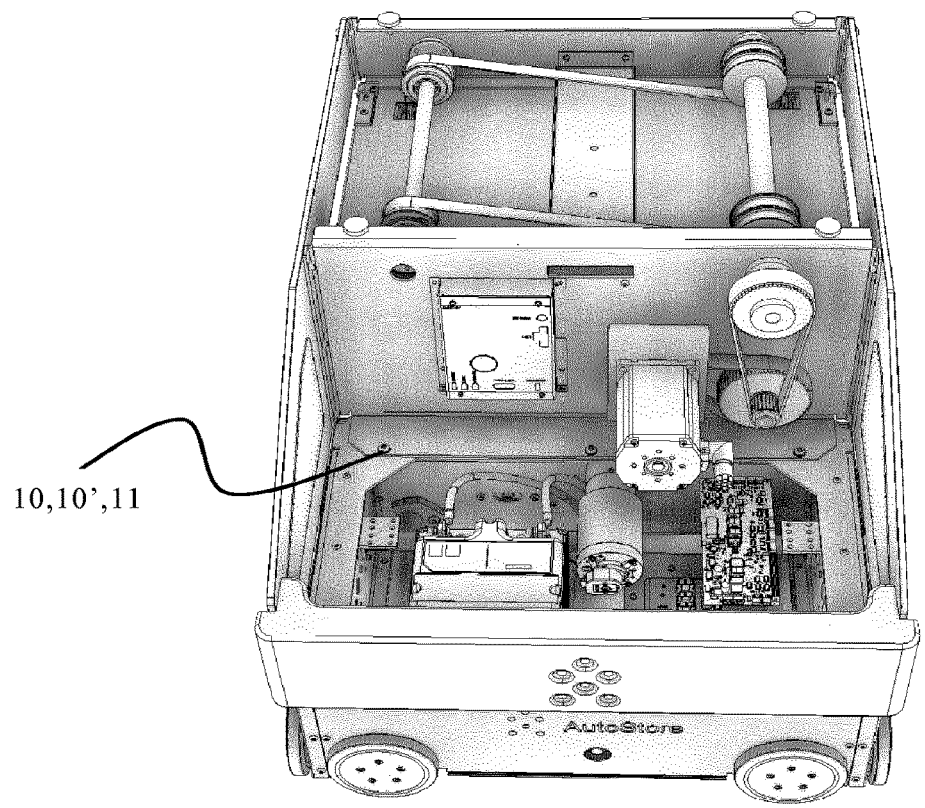
Figure 20:
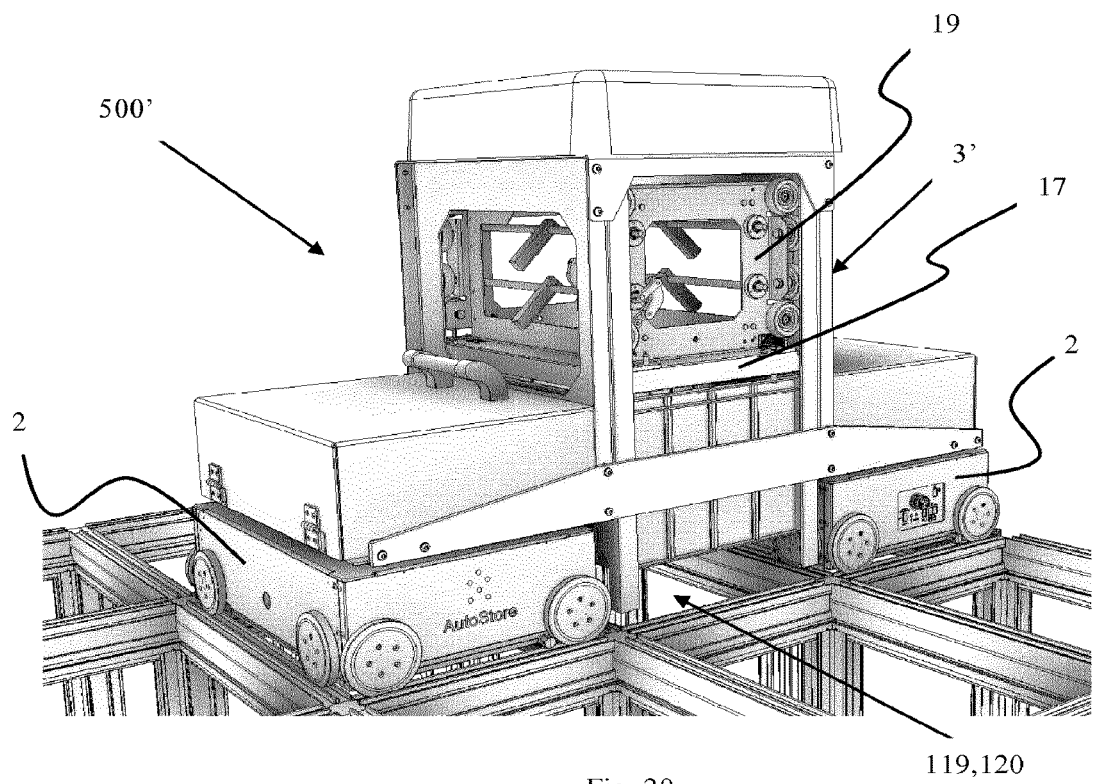
Figure 21:
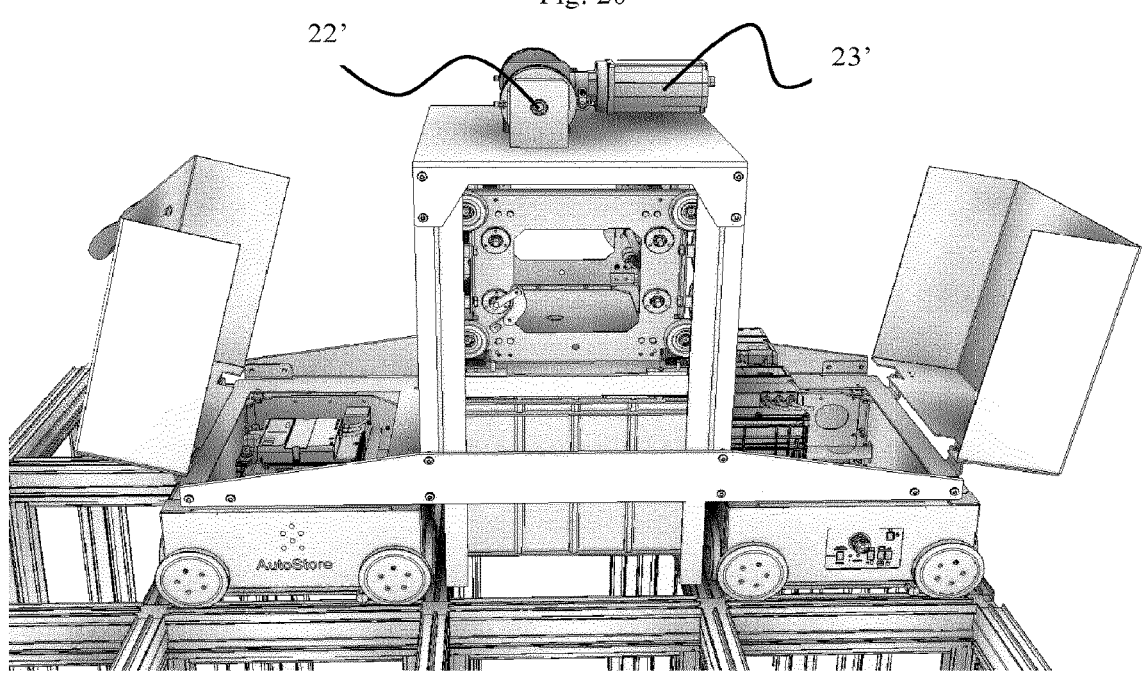

The third type of container vehicle 500' is similar to the container handling vehicle 500 shown in FIG. 4. A detailed view of the third type of container vehicle 500' is shown in FIGS. 20 and 21. The container vehicle 500' comprises two wheel base units 2 arranged on opposite sides of a bridge section 3' (i.e., a container handling module). The bridge section features a lifting device including a lifting frame 17, a guide shuttle 19, a lifting shaft 22' upon which wires or lifting bands (not shown) connected to the lifting frame or guide shuttle may be spooled, and a lift motor 23' for driving the lifting shaft. Further, the bridge section 3' features a connecting interface (not shown but comprises throughholes as shown in FIG. 19) on each of its opposite sides, each of the connecting interfaces connected to the connecting interface (i.e., top plate/flange 9) of a corresponding wheel base unit 2. The guide shuttle is arranged to interact with the vertical column profiles 102 of a storage grid structure 104 and prevent detrimental tilting of the lifting frame 17, and any storage container 106 connected thereto, when the lifting frame 17 is raised/lowered inside a transfer column 119,120.

Figure 13:
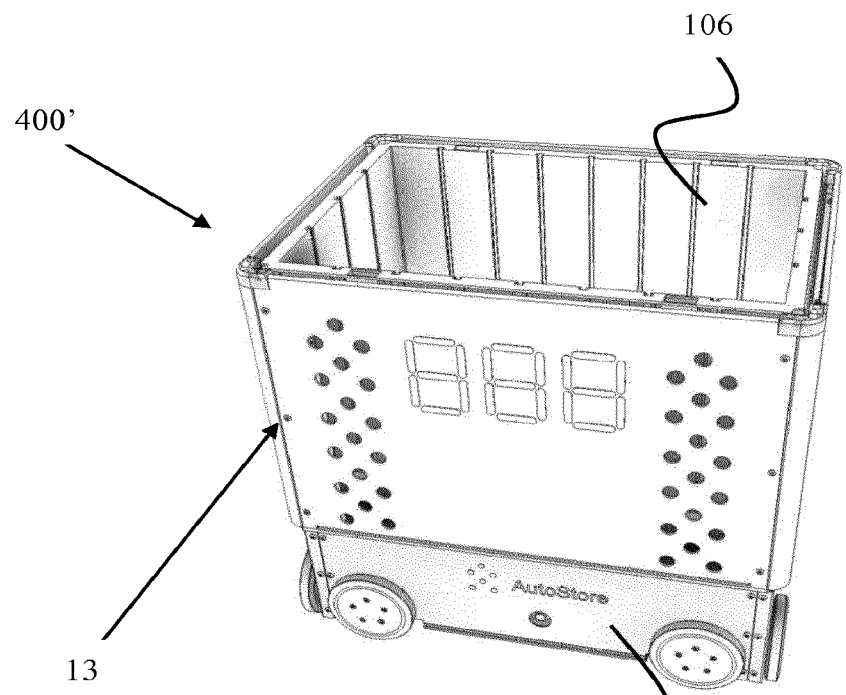
FIGS. 13-21 are perspective views of exemplary container handling vehicles according to the invention. embodiments.
Figure 14:
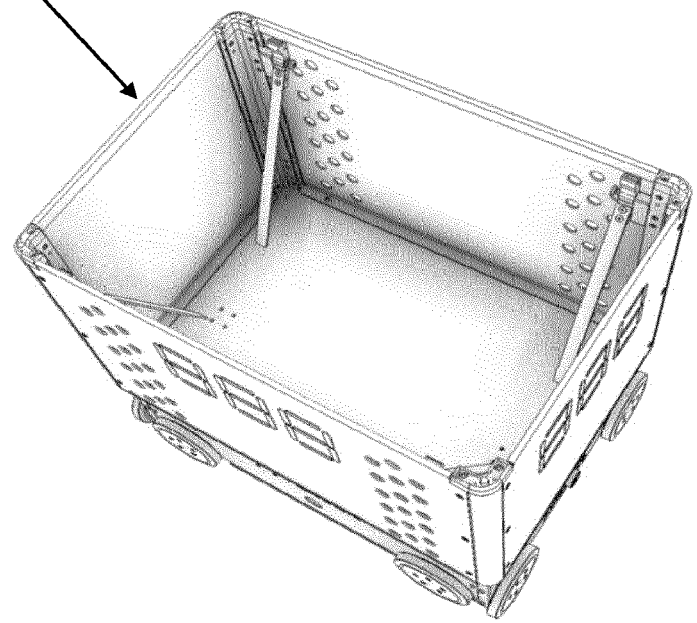
Figure 15:
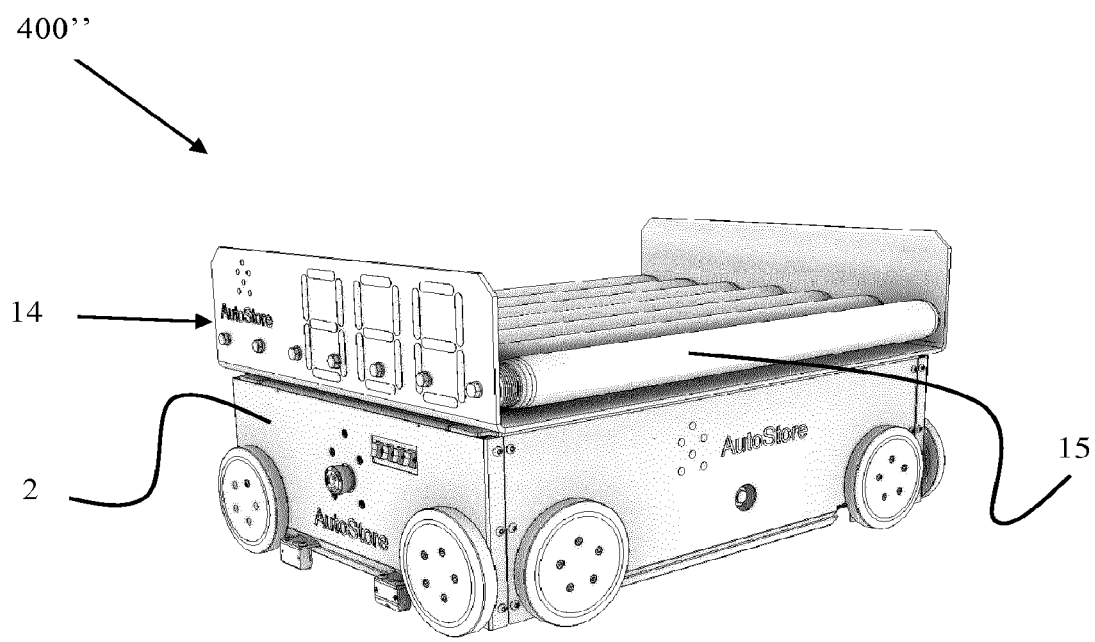
Figure 16:
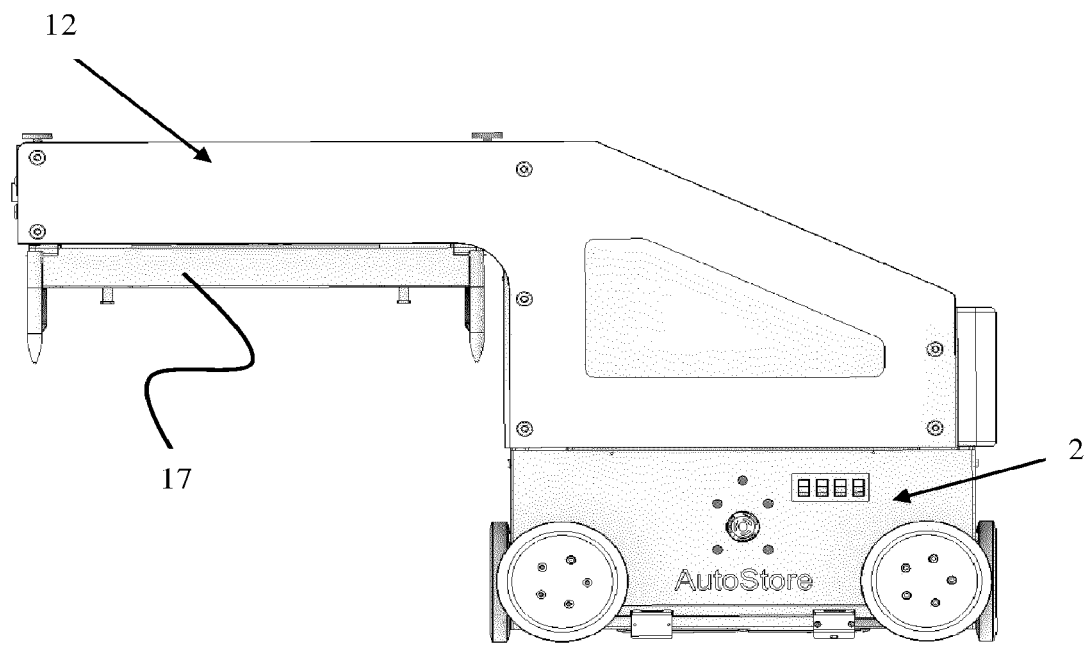
Figure 17:
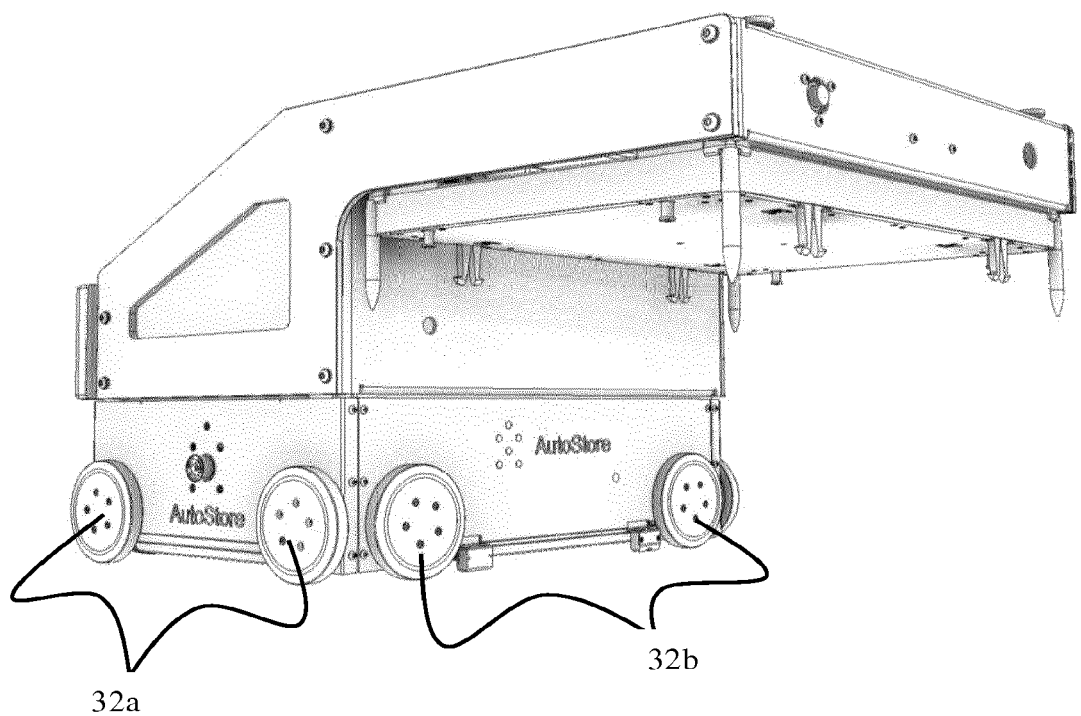
Figure 18:
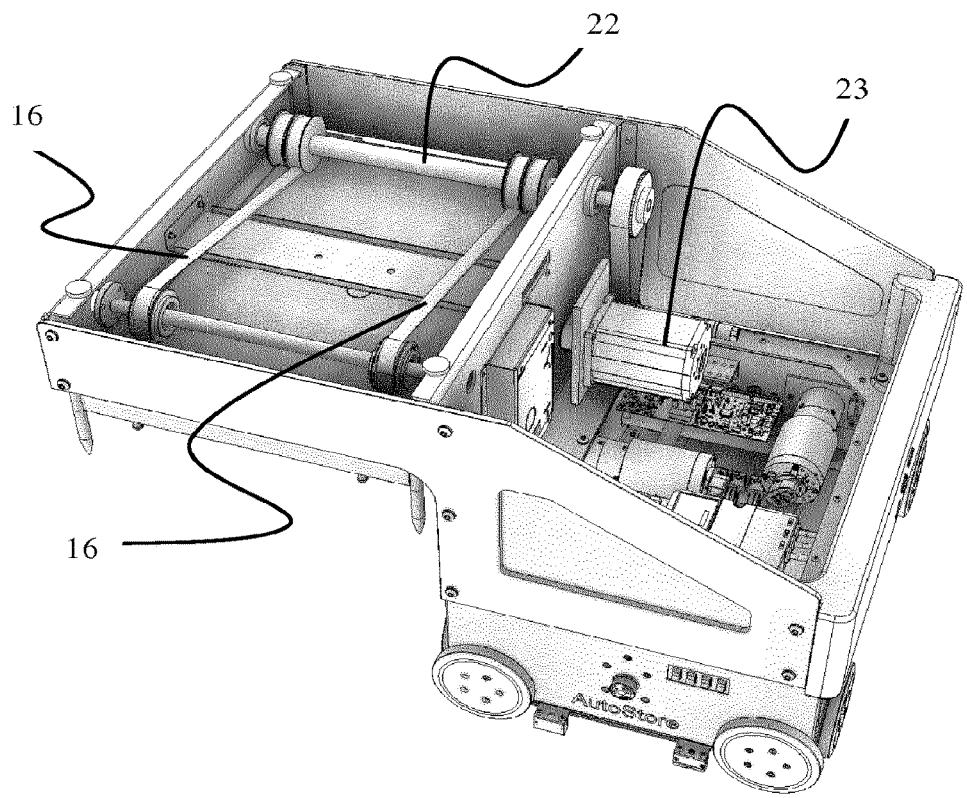

The fourth 400' and fifth 400" type of container vehicle are arranged to travel upon the transfer rail grid 5. Detailed views of the container vehicles 400', 400" are shown in FIGS. 13-15. Both container vehicles comprise a single wheel base unit 2 and a storage container carrier 13,14 (i.e., a container handling module) suitable for supporting a storage container 106. Each of the storage container carriers 13,14 comprises a connecting interface suitable for connecting to the top plate/flange 9 (i.e., connecting interface) of the wheel base unit 2. The container handling module 13 of the fourth type of container handling vehicle 400' comprises an open top box-shaped container receiver in which a storage container 106 may be accommodated. The container handling module 14 of the fifth type of container handling vehicle 400" comprises a roller conveyor 15 upon which a storage container 106 may be accommodated. By use of the roller conveyor 15, a storage container 106 may be transferred onto or off the container handling vehicle 400" in a lateral direction.

What is claimed is:

1. A modular container handling vehicle system for a storage system having a horizontal rail grid, the modular container handling vehicle system comprising at least one wheel base unit and at least a first and a second type of container handling module, wherein
   the wheel base unit comprises:
   a wheel arrangement for movement of the wheel base unit in two perpendicular directions upon a rail grid;
   an upper surface configured as a connecting interface for connection to any of the first and second container handling modules; and
   an electrical interface for electrical connection to any of the first and second container handling modules.

2. A modular container handling vehicle system according to claim 1, wherein the first and the second type of container handling module each comprise a container handling module selected from the group consisting of:
   a cantilever section having a lifting device, wherein the container handling module is connectable to a single wheel base unit and the lifting device is for raising and lowering a storage container positioned below the cantilever section;
   a bridge section to which at least one lifting device is connected, wherein the bridge section is connectable to two wheel base units, such that the bridge section is supported by a wheel base unit at each of two opposite ends and the lifting device is for raising and lowering a storage container positioned below the bridge section;
   a storage container carrier connectable to a single wheel base unit, such that a storage container may be supported on top of the wheel base unit; or
   a storage container carrier connectable to a single wheel base unit, the storage container carrier comprising a conveyor unit, such that a storage container may be supported on top of the wheel base unit and moved in a lateral direction when the conveyor unit is activated.

3. A modular container handling vehicle system according to claim 2, wherein one of the first and the second type of container handling modules is selected from a container handling module comprising a cantilever section having a lifting device, and the lifting device is arranged to raise and lower a storage container positioned below the cantilever section and comprises a lifting shaft, a motor for rotating the lifting shaft, a lifting frame for releasably connecting the storage container and lifting bands connecting the lifting shaft to the lifting frame.

4. A modular container handling vehicle system according to claim 1, wherein the connecting interface of the wheel base unit comprises a horizontal top panel featuring multiple connecting elements.

5. A modular container handling vehicle system according to claim 4, wherein each of the first and the second container handling module comprises a connecting interface for connection to the connecting interface of the wheel base unit.

6. A modular container handling vehicle system according to claim 5, wherein the connecting interface of the first and the second container handling module comprises connecting elements arranged at positions corresponding to the multiple connecting elements of the top panel.

7. A modular container handling vehicle system according to claim 4, wherein the top panel features a centre opening allowing access to internal components of the wheel base unit.

8. A modular container handling vehicle system according to claim 7, wherein the electrical interface is connected through the centre opening.

9. A modular container handling vehicle system according to claim 1, wherein each of the first and the second container handling module comprises a connecting interface for connection to the connecting interface of the wheel base unit.

10. A modular container handling vehicle system according to claim 1, wherein power is provided to any of the first and the second type of container handling modules by a rechargeable battery of the wheel base unit through the electrical interface.

11. A modular container handling vehicle system according to claim 1, wherein control of any of the first and the second type of container handling modules is controlled by a control system of the wheel base unit through the electrical interface.

* * * * *